(12) United States Patent
Klode et al.

(10) Patent No.: US 8,988,023 B2
(45) Date of Patent: Mar. 24, 2015

(54) PORTABLE SERVICE CONTROLLER FOR ELECTRO-MECHANICAL ACTUATORS

(71) Applicants: Harald Klode, Centerville, OH (US); Albert K. Pant, Carlisle, OH (US)

(72) Inventors: Harald Klode, Centerville, OH (US); Albert K. Pant, Carlisle, OH (US)

(73) Assignee: Goodrich Corporation, Charlotte, NC (US)

( * ) Notice: Subject to any disclaimer, the term of this patent is extended or adjusted under 35 U.S.C. 154(b) by 302 days.

(21) Appl. No.: 13/690,400

(22) Filed: Nov. 30, 2012

(65) Prior Publication Data

US 2014/0152200 A1 Jun. 5, 2014

(51) Int. Cl.
*H02P 6/08* (2006.01)
*H02P 23/00* (2006.01)
*B64F 5/00* (2006.01)
*H02P 27/08* (2006.01)
*H02P 25/16* (2006.01)
*H02P 25/02* (2006.01)

(52) U.S. Cl.
CPC .......... *H02P 23/0004* (2013.01); *B64F 5/0045* (2013.01); *H02P 27/085* (2013.01); *H02P 25/16* (2013.01); *H02P 25/021* (2013.01)
USPC ................................ 318/400.09; 318/400.12

(58) Field of Classification Search
USPC .............. 318/400.05, 400.09, 400.1, 400.12, 318/400.13, 700, 703
See application file for complete search history.

(56) References Cited

U.S. PATENT DOCUMENTS 5,023,528 A * 6/1991 Saidin et al. ............. 318/400.34
5,838,124 A * 11/1998 Hill .............................. 318/269
5,872,434 A * 2/1999 Hill .............................. 318/159
7,265,512 B2 * 9/2007 McMillan et al. ............ 318/663

* cited by examiner

*Primary Examiner* — Bentsu Ro
(74) *Attorney, Agent, or Firm* — Cantor Colburn LLP

(57) ABSTRACT

A portable service controller for controlling an electro-mechanical actuator, the portable service controller includes a battery configured to power the portable service controller and a user interface configured to receive input from a user and to responsively generate an input signal. The portable service controller also includes a phase sequencer configured to convert the input signal into a series of timed output signals and a driver circuit configured to convert the series of timed output signals into inverter gating signals. The portable service controller further includes a three-phase brushless motor inverter configured to convert inverter gating signals into control signals for a brushless motor of the electro-mechanical actuator. The portable service controller contains a motor brake on/off circuitry for engaging and disengaging the electro-mechanical actuator motor brake. The battery, the three-phase brushless motor inverter, the driver circuit, the phase sequencer and the user interface are all disposed in a housing.

11 Claims, 6 Drawing Sheets

PORTABLE SERVICE CONTROLLER FOR ELECTRO-MECHANICAL ACTUATORS

BACKGROUND OF THE INVENTION

The present disclosure relates to the field of electro-mechanical actuators, and more specifically, to a portable service controller for electro-mechanical actuators.

Electro-mechanical actuators are currently used in a wide variety of applications. For example, electro-mechanical actuators are currently used in machine tools industrial machinery, computer peripherals such as disk drives and printers, valves and dampers, and in many other places where linear motion is required. In general, electro-mechanical actuators typically operate by converting the rotary motion of an electric motor into linear displacement of an actuator.

Aircraft typically include multiple electro-mechanical actuators that are used to control the operations of various parts of the aircraft, such as brakes, flaps, etc. In general, these electro-mechanical actuators can be operated by a controller built into the electronics system of the aircraft or by a high voltage service controller that is configured to be plugged into a 120/240 AC volt power source.

When an aircraft is on the ground and actuation via the electro-mechanical actuator controller is not possible (for instance due to a failed electro-mechanical actuator controller, a failed wire bundle or a general lack of electrical aircraft power), the electro-mechanical actuators are typically actuated with the help of a ground-station electro-mechanical actuator controller that is powered from an A/C power outlet (110VAC to 480VAC). In situations where an electro-mechanical actuator is 'locked under force' and a ground station electro-mechanical actuator controller is not available and/or A/C power cannot be supplied, electro-mechanical actuator unlocking is currently accomplished via mechanical actuation of the motor shaft or other members of the actuator's mechanism. Mechanical actuation requires the use of a special tool that is inserted into the electro-mechanical actuator, which typically requires the removal of fasteners, safety wires, access panels and seals. Some electro-mechanical actuators have a motor brake to hold the actuator in place. Therefore, the motor brake may need to be released in order for the actuator to be unlocked.

BRIEF DESCRIPTION OF THE INVENTION

According to one embodiment, a portable service controller for controlling an electro-mechanical actuator includes a battery configured to power the portable service controller and a user interface configured to receive input from a user and to responsively generate an input signal. The portable service controller also includes a phase sequencer configured to convert the input signal into a series of timed output signals and a driver circuit configured to convert the series of timed output signals into inverter gating signals. The portable service controller further includes a three-phase brushless motor inverter configured to convert inverter gating signals into control signals for a brushless motor of the electro-mechanical actuator. The battery, the three-phase brushless motor inverter, the driver circuit, the phase sequencer, the motor brake circuit, and the user interface are all disposed in a housing.

Accordingly to another embodiment, a portable service controller includes a user interface configured to receive input from a user and to responsively generate an input signal and a phase sequencer configured to convert the input signal into a series of timed output signals based on a phase sequencing table. The portable service controller also includes a driver circuit configured to convert the series of timed output signals into inverter gating signals and a three-phase brushless motor inverter configured to convert inverter gating signals into control signals suitable for controlling a brushless motor. The three-phase brushless motor inverter, the driver circuit, the phase sequencer, the motor brake circuit, and the user interface are all disposed in a housing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In one embodiment, a portable service controller is provided to simplify the removal of electro-mechanical actuators from the brakes of aircraft in the field (i.e., from an aircraft parked on the tarmac). While the portable service controller disclosed is primarily discussed as being used for aircraft brake electro-mechanical actuators, it will be appreciated by those of ordinary skill in the art that the portable service controller can be used with other aircraft-installed electro-mechanical actuators (e.g., flap actuators, aileron actuators, etc.) to simplify installment, removal or adjustment of those electro-mechanical actuators). In addition, the portable service controller may be used for controlling other non-aircraft based electro-mechanical actuators.

Figure 1:
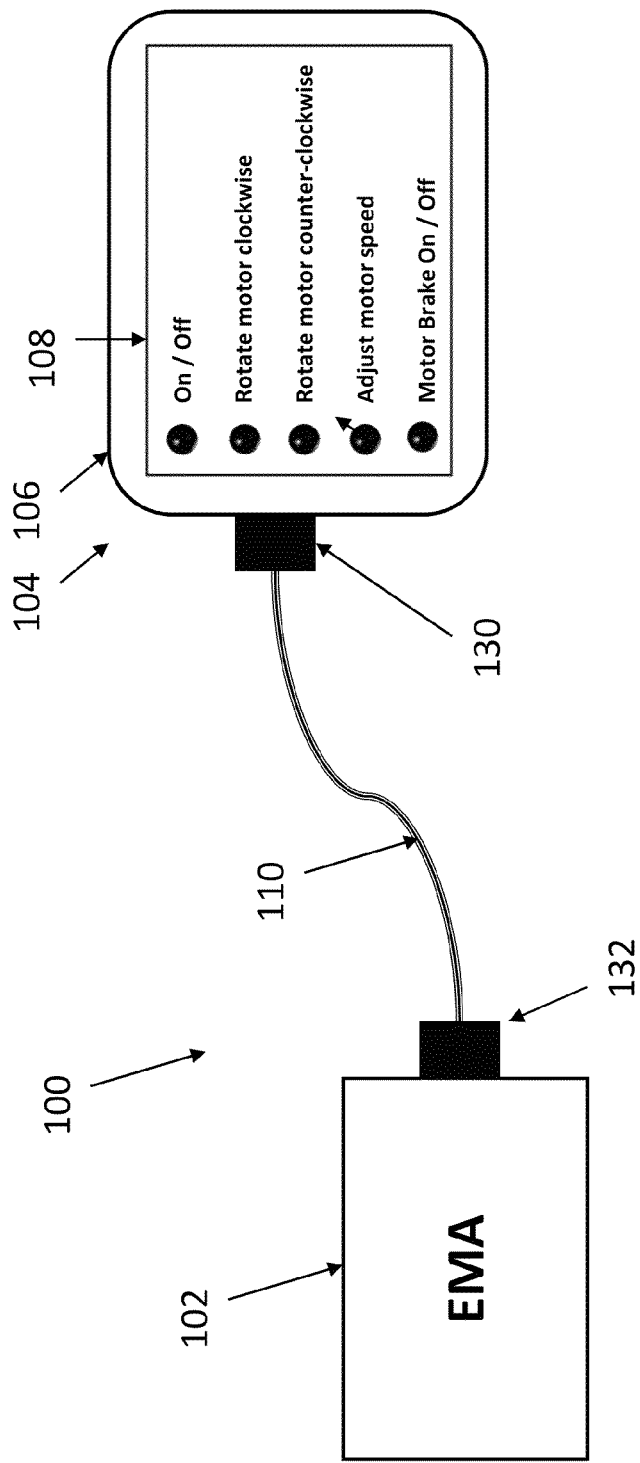
FIG. 1 is a block diagram of a system having a electro-mechanical actuator and a portable service controller in accordance with an embodiment of the disclosure.

Referring now to FIG. 1, a system 100 having an electro-mechanical actuator 102 and a portable service controller 104 in accordance with an embodiment of the disclosure is shown. As illustrated the electro-mechanical actuator 102 is coupled to the portable service controller 104 via a cable 110, which is configured to connect to an electro-mechanical actuator connector 132 and a portable service controller connector 130. The portable service controller 102 includes a housing 106 and a user interface 108 configured to facilitate user operation of the portable service controller 102. The user interface 108 may include a plurality of controls to turn on/off the electromechanical actuator 102, rotate the electro-mechanical actuator 102, and to adjust the speed of the rotation of the electro-mechanical actuator 102, and to engage or disengage the motor brake of the electromechanical actuator 102. The user interface 108 may include a variety of knobs, switches, touch screen elements, or the like to allow the user to control the electro-mechanical actuator 102.

In one embodiment, the portable service controller 104 is a portable hand held device that is configured to be connected to a variety of electro-mechanical actuator 102. The portable service controller 104 may be used to control the operation of an electro-mechanical actuator 102 when the primary controller for the electro-mechanical actuator 102 has failed or lost power. In addition, the portable service controller 104 may include a battery sufficient to power both portable service controller 104 and the electro-mechanical actuator 102. Accordingly, the portable service controller 104 is configured to be used to control electro-mechanical actuators 102 when a high voltage power source is not readily available.

Figure 2:
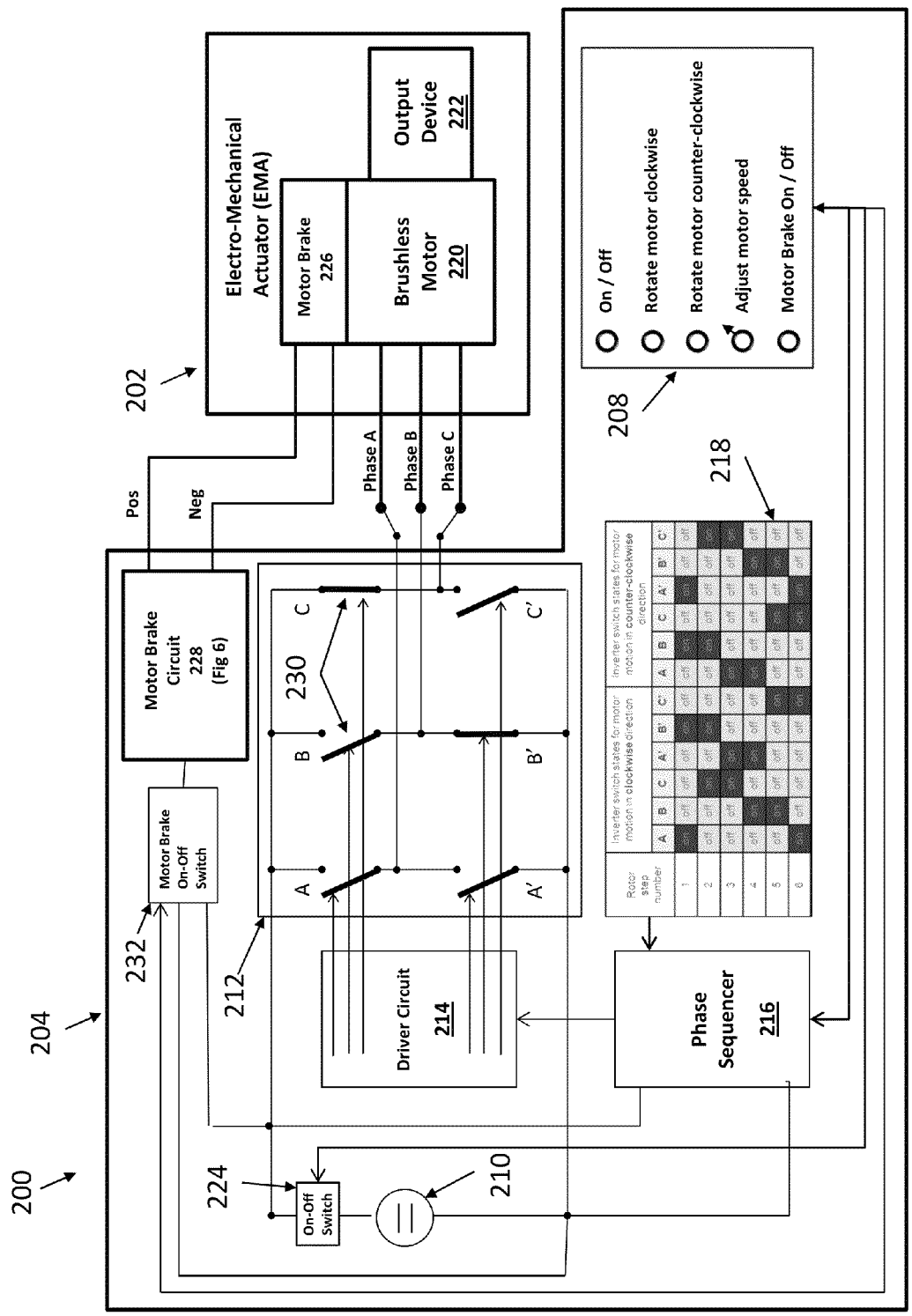
FIG. 2 is a block diagram of a system having a electro-mechanical actuator and a portable service controller in accordance with another embodiment of the disclosure.

Referring now to FIG. 2, a system 200 having an electro-mechanical actuator 202 and a portable service controller 204 in accordance with an embodiment of the disclosure is shown. As illustrated, the electro-mechanical actuator 202 includes a brushless motor 220 which is coupled to a motor brake 226 and coupled to an output device 222, such as a drive shaft or piston. The portable service controller 204 includes a battery 210, a three-phase brushless motor inverter 212, a driver circuit 214, a phase sequencer 216, an on-off switch 224, motor brake circuit 228 and a motor brake on-off switch 232, all of which are disposed in a single housing, as shown in FIG. 1. In one embodiment, the brushless motor 220 of the electro-mechanical actuator 202 is operated in 'position-sensorless' or 'open-loop' stepper mode, which reduces the amount of wiring between the electro-mechanical actuator 202 and the portable service controller 204.

In one embodiment, the battery 210 is a small, low-voltage battery that is suitable to power the portable service controller 204 and the electro-mechanical actuator 202. For example, the battery 210 may be a twelve volt battery that has a current rate of three to three and a half amperes. The battery 210 can be either replaceable or rechargeable type battery. In one embodiment, the on-off switch 224 is configured to selectively turn the portable service controller 204 on or off In one embodiment, the three-phase inverter 212 includes a plurality of electronic switches 230 (e.g., MOSFETs, IGBTs, Bipolar) that are configured to control the current flow between the battery 210 and the brushless motor 220 of the electro-mechanical actuator 202.

In one embodiment, the driver circuit 214 is configured to drive the inputs (e.g., gates) of the electronic switches 230 and to convert an input from the phase sequencer 216 into appropriate inverter gating signals. In one embodiment, the phase sequencer 216 is configured to convert operator inputs (e.g., motor direction, motor speed) received from the user interface 208 into a series of timed output signals, which are provided to the drive circuit 214. In one embodiment, the phase sequencer 216 may utilize a phase sequencing table 218 to convert the operator inputs into the timed output signals.

Figure 3A:
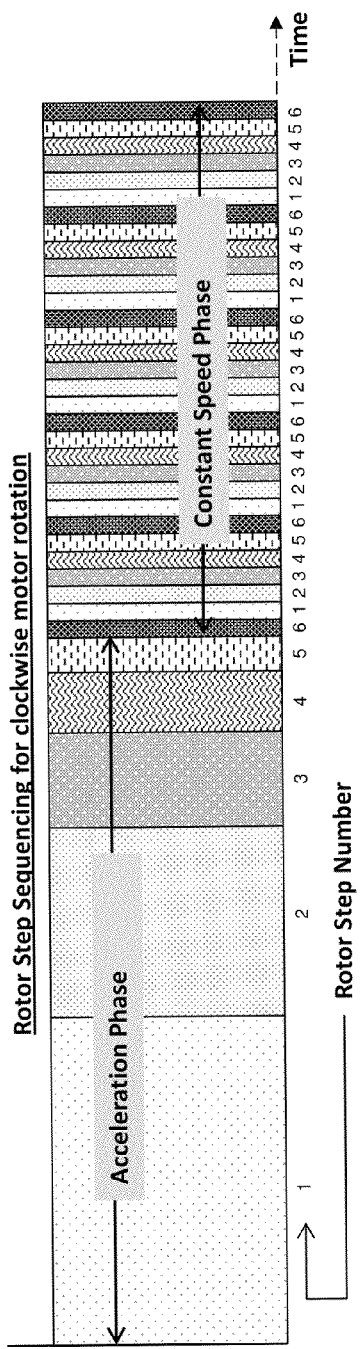
FIG. 3A is a block diagram of a step sequence for operating a brushless motor in a clockwise rotation.
Figure 3B:
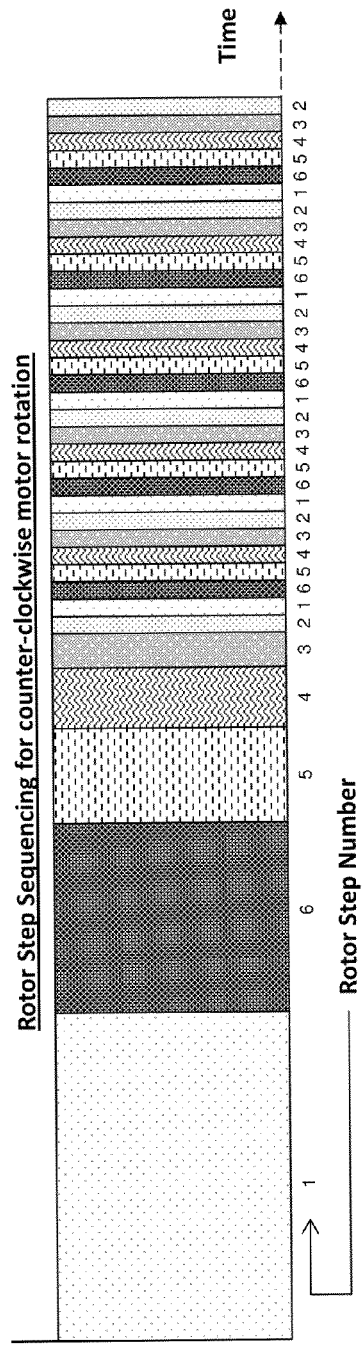
FIG. 3B is a block diagram of a step sequence for operating a brushless motor in a counter-clockwise rotation.

In one embodiment, the brushless motor 220 of the electro-mechanical actuator 204 is operated without rotor position feedback. The portable service controller 204 provides individual step commands to the brushless motor 220 at a steadily increasing rate until the step rate has reached the desired motor speed. By ramping up the step rate in this manner, the brushless motor 220 follows the step request without losing synchronicity. FIG. 3A depicts a step sequence for operating the brushless motor 220 in a clockwise rotation. Likewise, FIG. 3B depicts a step sequence for operating the brushless motor 220 in a counter-clockwise rotation. It will be appreciated by those of ordinary skill in the art that the step sequences shown are for illustration purposes only and that any suitable step sequence may be used to control the operation of the brushless motor 220.

Figure 4:
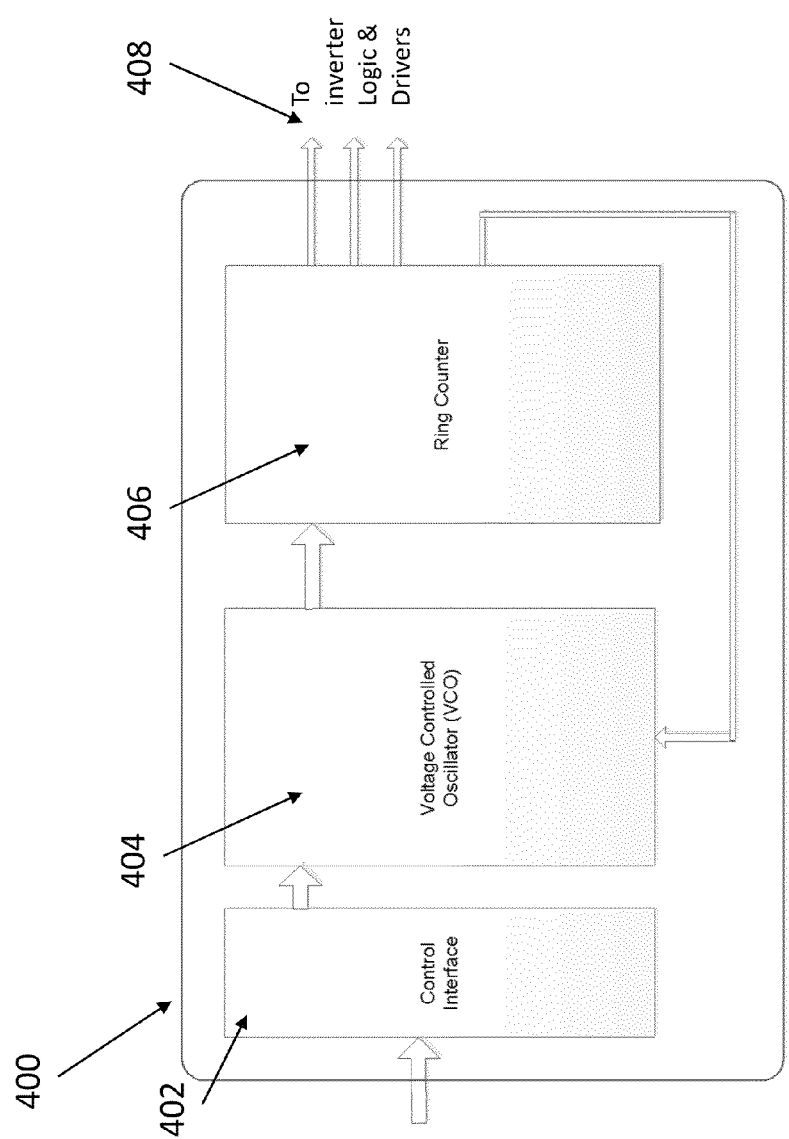
FIG. 4 is a block diagram of a phase sequencer in accordance with another embodiment of the disclosure.

Referring now to FIG. 4, a block diagram of one embodiment of a phase sequencer 400 is shown. In one embodiment, the phase sequencer 400 includes a control interface 402, a voltage controlled oscillator 404 and a ring counter 406. In one embodiment, the control interface 402 is configured to receive one or more input signals from a user and to convert the input signals to a ramp voltage. The ramp voltage is provided to the voltage controlled oscillator 404, which responsively produces a voltage-to-frequency signal that is provided to the ring counter 406. The frequency of the voltage controlled oscillator 404 is used to clock the ring counter 406. In one embodiment, the ring counter 406 is configured to count to three and then reset, this sequence can be repeated until the stop input is received.

Figure 5:
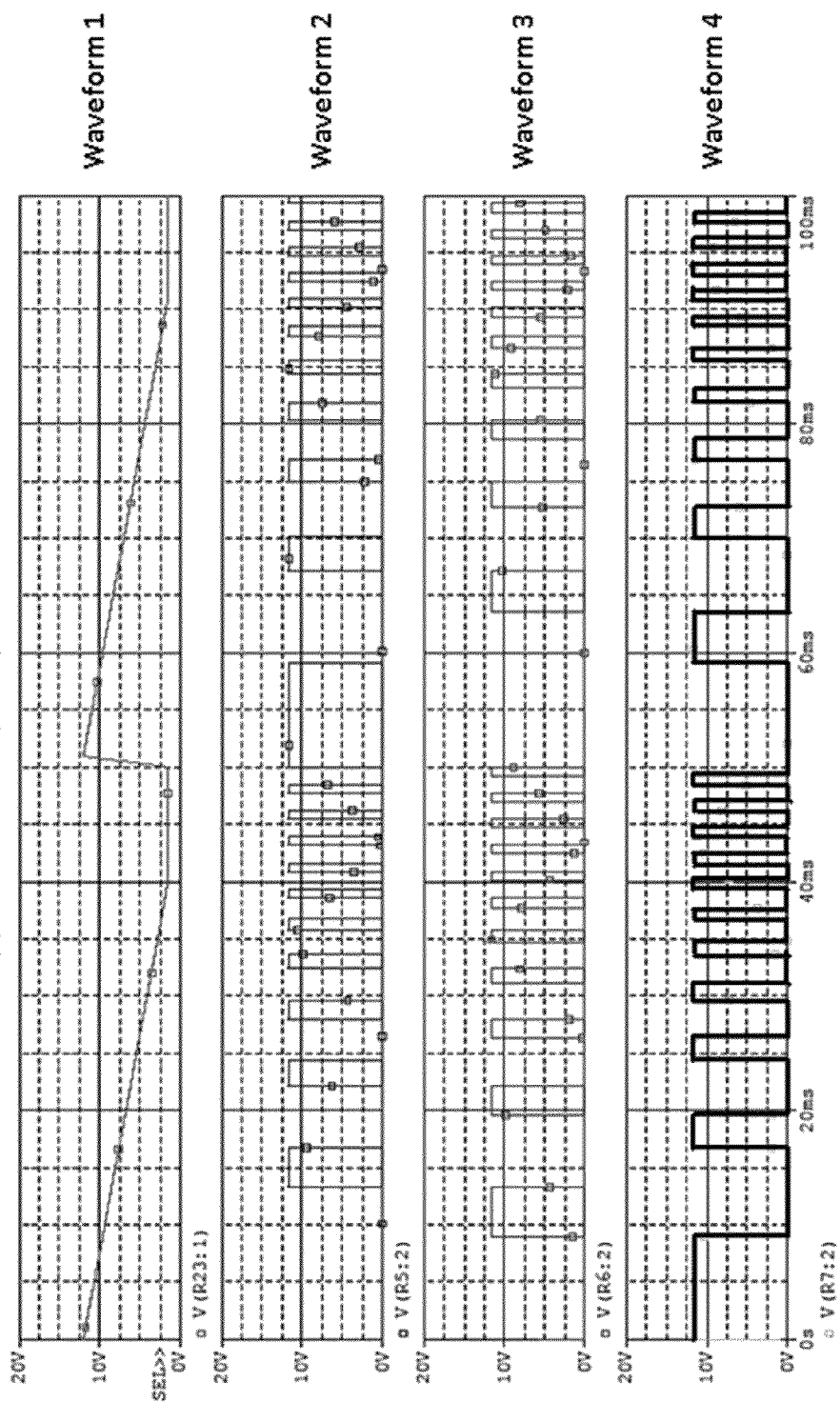
FIG. 5 is a timing diagram illustrating the signal waveforms of the phase sequencer in accordance with an embodiment of the disclosure.

Referring now to FIG. 5, a timing diagram illustrating the signal waveforms of the phase sequencer in accordance with an embodiment of the disclosure is shown. Waveform 1 is the ramp voltage that is provided to the voltage controlled oscillator 404. Waveform 2, waveform 3 and waveform 4 are the outputs from the ring counter 406 into the Driver Circuit 214. Waveform 2, waveform 3 and waveform 4 represent the rotor step sequencing of the three motor phases of the EMA from slow speed to a higher speed.

Figure 6:
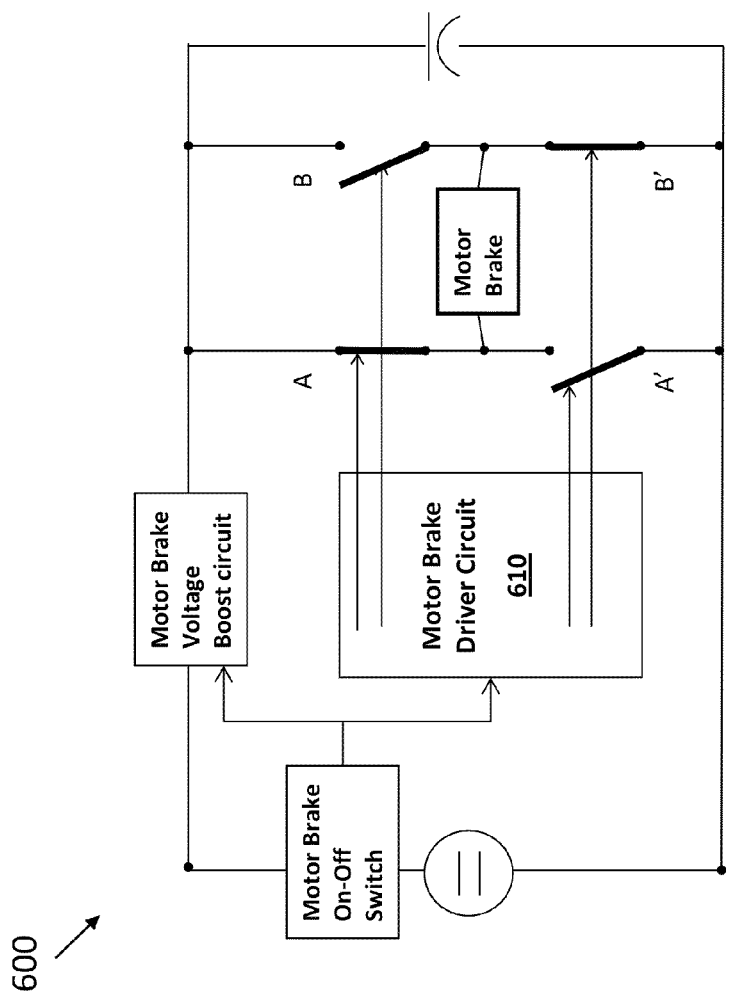
FIG. 6 is a block diagram of a motor brake circuit in accordance with an embodiment of the disclosure.

Referring to FIG. 6, the motor brake circuit shows a motor brake on/off switch which has a momentary action that feeds the motor brake driver circuit 610 and the motor brake voltage boost circuit. The motor brake driver circuit closes switches A and B' when the motor brake on/off switch goes to the 'on' state to engage the motor brake. The motor brake driver circuit closes switches A' and B when the motor brake on/off switch goes to the 'off' state to disengage the motor brake. The Motor Brake Voltage Boost circuit steps up the battery voltage to a voltage level required to engage or disengage the Motor Brake.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A portable service controller for controlling an electro-mechanical actuator, the portable service controller comprising:
   a battery configured to power the portable service controller;
   a user interface configured to receive input from a user and to responsively generate an input signal;
   a phase sequencer configured to convert the input signal into a series of timed output signals;
   a driver circuit configured to convert the series of timed output signals into inverter gating signals; and a three-phase brushless motor inverter configured to convert inverter gating signals into control signals for a brushless motor of the electro-mechanical actuator;

wherein the battery, the three-phase brushless motor inverter, the driver circuit, the phase sequencer and the user interface are all disposed in a housing.

2. The portable service controller of claim 1, wherein the phase sequencer comprises a phase sequencing table that is used to convert the operator inputs into the timed output signals.

3. The portable service controller of claim 1, wherein the three-phase brushless motor inverter comprises a plurality of MOSFETs.

4. The portable service controller of claim 1, wherein the user interface includes an on/off control, a rotation speed control, a rotation direction control and motor brake on/off control.

5. The portable service controller of claim 1, further comprising an on off switch disposed in the housing.

6. The portable service controller of claim 1, wherein the battery is a low-voltage battery that is suitable to power the portable service controller and the electro-mechanical actuator.

7. The portable service controller of claim 1, wherein the housing is a portable and the portable service controller is a hand held device.

8. A portable service controller comprising:

a user interface configured to receive input from a user and to responsively generate a input signal;

a phase sequencer configured to convert the input signal into a series of timed output signals based on a phase sequencing table;

a driver circuit configured to convert the series of timed output signals into inverter gating signals;

a three-phase brushless motor inverter configured to convert inverter gating signals into control signals suitable for controlling a brushless motor;

wherein the three-phase brushless motor inverter, the driver circuit, the phase sequencer and the user interface are all disposed in a housing.

9. The portable service controller of claim 8, wherein the phase sequencer comprises a phase sequencing table that is used to convert the operator inputs into the timed output signals.

10. The portable service controller of claim 8, wherein the three-phase brushless motor inverter comprises a plurality of MOSFETs.

11. The portable service controller of claim 8, wherein the user interface includes an on/off control, a rotation speed control, a rotation direction control and motor brake on/off control.

* * * * *